Nov. 1, 1932.  P. T. LINDHARD  1,885,845
MANUFACTURE OF HYDRAULIC CEMENT
Filed June 20, 1930   2 Sheets-Sheet 2
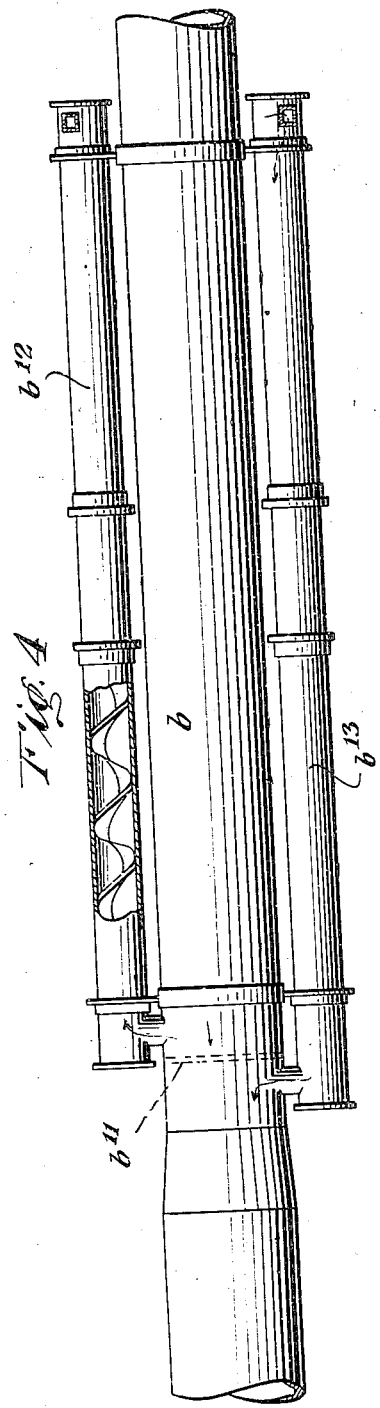
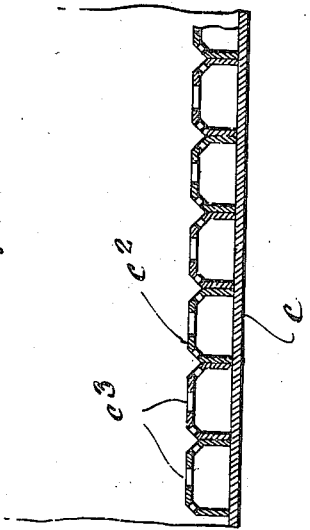
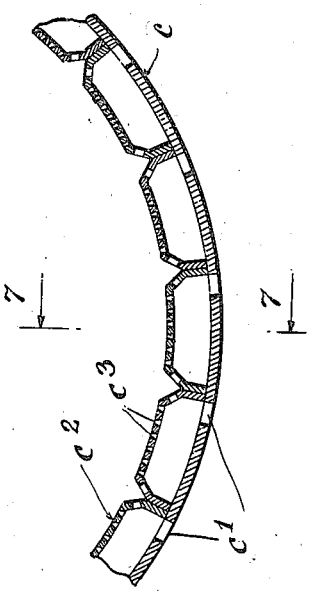
Inventor
Poul T. Lindhard
By his Attorneys
Redding, Greeley, O'Shea & Campbell Patented Nov. 1, 1932, 1,885,845

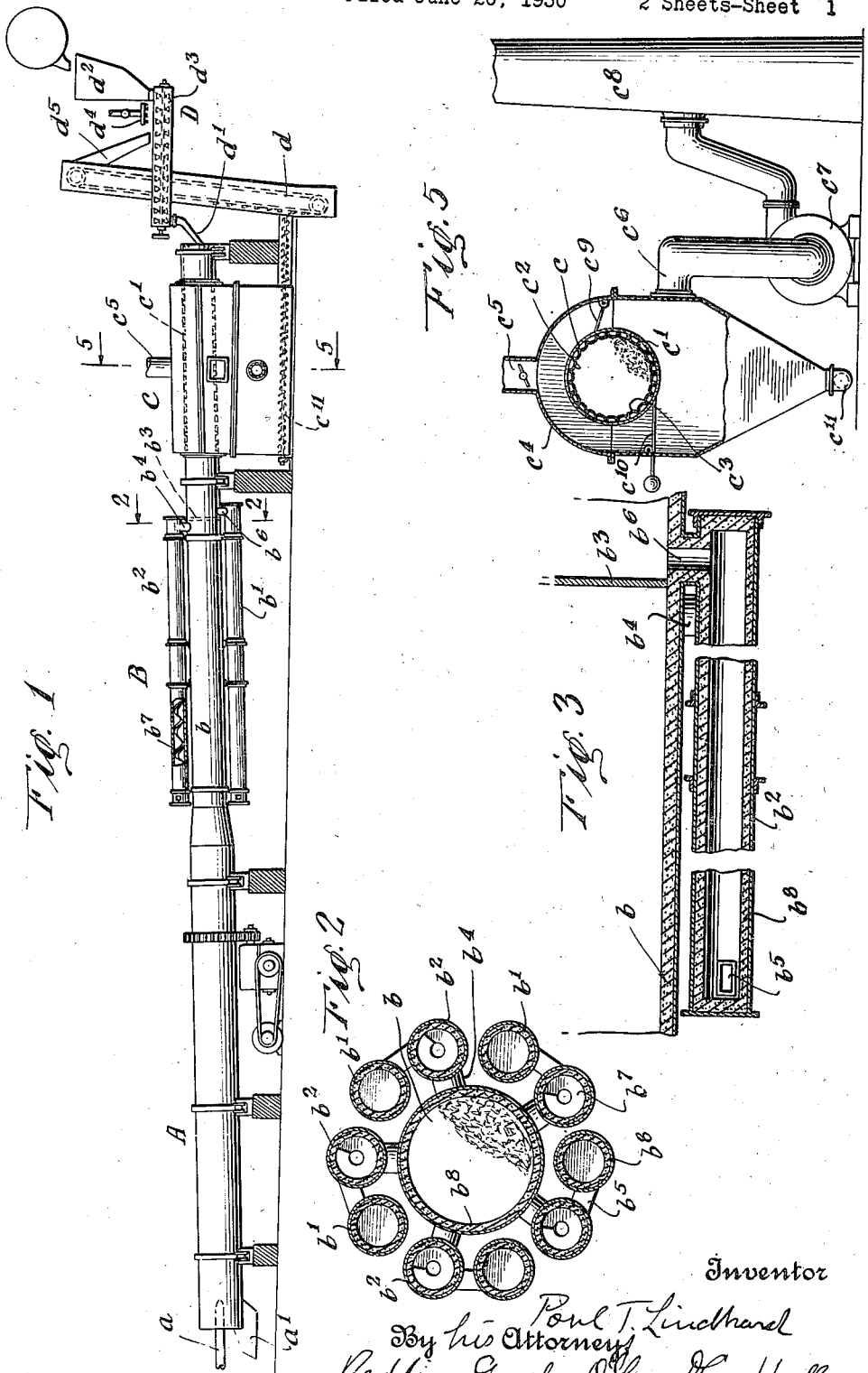

UNITED STATES PATENT OFFICE

POVL T. LINDHARD, OF BROOKLYN, NEW YORK, ASSIGNOR TO F. L. SMIDTH & CO., OF NEW YORK, N. Y., A CORPORATION OF NEW JERSEY

MANUFACTURE OF HYDRAULIC CEMENT

Application filed June 20, 1930. Serial No. 462,441.

This invention relates particularly to the treatment of cement raw material in rotary kilns, to which the raw material is fed preferably in the shape of nodules or pellets, which may be formed by adding water to dry pulverulent materials and shaping them by suitable mechanical means, such as a pug mill, or which may be formed by suitable mechanical means from the filter cake of slurry filters, with the possible addition of dry dust. The principal object of the invention has been to secure greater fuel economy than has been possible hitherto in the operation of rotary kilns, in which, as is well understood, the transfer of heat from the combustion gases to the material has not attained the maximum degree which would be desirable and the combustion gases have therefore left the kiln at a relatively high temperature. In seeking to attain the main purpose of the present invention and a more nearly complete transfer of heat from the combustion gases to the material treated, with less loss of heat in the escaping gases, it has been sought to expose to the action of the combustion gases the largest possible surface of the raw material, during the passage of the gases in one direction and the passage of the material in the opposite direction, and to bring about a more intimate contact between such materials and the gases than has been possible heretofore in the operation of rotary kilns. At the same time it has been sought to keep the length of the kiln within reasonable limits.

The invention is concerned primarily with the calcining zone or section of the kiln, in which, as is well understood, the greatest amount of heat is required and in which, in accordance with the invention, provision is made for the greatest possible amount of surface exposure of the material to the combustion gases, with consequent maximum heat transfer, and for great intimacy of contact between the material and the combustion gases with consequent improvement in the uniformity of quality of the finished product.

With the more effective transfer of heat from the combustion gases to the material in the calcining zone of the kiln, the gases which pass therefrom into the preliminary heating and drying zone or section of the kiln are at a lower temperature than has been usual heretofore and therefore while they are sufficiently hot to accomplish the desired drying and preliminary heating, especially when the drying and heating are carried out as will be explained, they are not at such high temperature as to have a destructive effect upon the structural elements of the drying and heating zone or section of the kiln.

The invention will be more fully explained hereinafter with reference to the accompanying drawings in which it is illustrated, and in which:

Figure 1 is a somewhat diagrammatic view, in longitudinal, sectional elevation, of a kiln which is adapted for the practice of the invention.

Figure 2 is a detail view in transverse section on the plane indicated by the broken line 2—2 of Figure 1.

Figure 3 is a detail view in longitudinal, sectional elevation through the calcining zone or section of the kiln.

Figure 4 is a view similar to Figure 3 but illustrating a modification.

Figure 5 is a detail view in transverse section, through the drying and heating zone or section of the kiln, on the plane indicated by the broken line 5—5 of Figure 1.

Figures 6 and 7 are detail views illustrating the preferred construction employed in the drying and heating zone or section.

The clinkering sections of the kiln adapted to contain the zone, the calcining zone, and the heating zone, are indicated generally in Figure 1, at A, B and C, respectively, and the material forming and feeding mechanism is indicated conventionally at D.

The clinkering zone or section A of the kiln may be of any usual or suitable construction, being provided, as indicated at $a$, with a suitable fuel supply and, as indicated at $a^1$, with a suitable discharge for the hot clinker and, as indicated at $b^3$, with a suitable lining.

The calcining zone or section of the kiln is made up of a main cylindrical portion or shell $b$ and a series of tubes $b^1$ and $b^2$. In the arrangement shown in Figure 1 the shell $b$ is closed at its upper end by a partition $b^3$ and each tube $b^1$ is connected at its upper end, as at $b^6$, with an extended shell of the kiln above the partition $b^3$, so that the material which has been dried and heated in the zone or section C is delivered therefrom into all of the tubes $b^1$. Each of the tubes $b^1$ is connected, as at $b^5$, with the corresponding tube $b^2$ which in turn is connected at its upper end, as at $b^4$, with the main part $b$ below the partition $b^3$, so as to deliver the material received by it from the tube $b^1$ into the main part $b$ of the kiln. The material which is received from the heating zone C passes, under the influence of gravity, in the operation of the kiln, through the tube $b^1$ to its lower end and is delivered therefrom, under the influence of gravity, through the connection $b^5$, into the lower end of the corresponding tube $b^2$ which is provided interiorly with flights $b^7$ by which, in the continued rotation of the kiln, the material is caused to move toward the upper end of the tube $b^2$ whence it is delivered through the connection $b^4$ into the main part $b$. It will be understood that the combustion gases pass from the upper end of the calcining zone into the tubes $b^1$ and thence into the tubes $b^2$ and thence into the heating zone in countercurrent as to the movement of the material. It will be further observed, not only that there is a great surface of material exposed to the action of the combustion gases in the long path of movement of the material from the time it enters the tubes $b^1$ until it leaves the calcining zone, but that in the rotation of the kiln, the material in the tubes $b^1$ and $b^2$, as well as in the main part $b$, is continually shifted with the result that intimate contact of the combustion gases and the material is accomplished. It will further be observed that while the ratio of exposed internal surface of the sintering zone to the cross-sectional area of the zone may be normal, through the construction described the ratio of the exposed surface of the calcining zone to the cross-section of that zone, which is an important factor in the transfer of heat to the material, through radiation from that portion of the lining which is not covered by the material, is greatly increased as compared with that permitted in a single tube kiln, while at the same time the length of the calcining zone is kept within reasonable limits. In such a structure as that illustrated in the drawings, with the calcining zone 80 feet in length and the main part of the kiln 10 feet in diameter, and the tubes $b^1$ and $b^2$ corresponding in diameter about as indicated, it is easily possible to create a ratio between the exposed surface of the calcining zone and its cross-section of upwards of 200:1.

In the arrangement shown in Figure 4 the partition $b^{11}$ is placed near the lower end of the central shell $b$, the tubes $b^{12}$ are connected to the shell $b$ above the partition $b^{11}$, and are connected to the tubes $b^{13}$ at the upper end and the tubes $b^{13}$ are connected to the central shell below the partition $b^{11}$. In this construction the material passes from the central shell near its lower end into the tubes $b^{12}$, thence into the tubes $b^{13}$, and thence into the central shell below the partition, while the combustion gases in the tubes $b^{13}$ from the central shell below the partition pass thence into the tubes $b^{12}$, and thence into the central shell above the partition $b^{11}$. This arrangement is in effect a reversal of that shown in Figure 3.

It will be understood, of course, that the main part $b$ and the tubes $b^1$ and $b^2$ and their connections have a suitable lining, indicated generally at $b^8$.

The heating zone C is so constructed that the gases which enter it from the calcining zone, relatively reduced in temperature but still hot enough to effect the desired purpose of the conditions to be described, are compelled to pass through the material as it is received in the heating zone and while it continues to move therein from the upper or feed end to the lower end of that zone where it passes into the tube $b^1$. To accomplish this the shell $c$ is perforated throughout its length and throughout its circumference, as indicated at $c^1$ in Figures 1, 5 and 6. The shell $c$ is preferably provided with a lining $c^2$ of metal boxes or ducts, as shown, which may be grouted in position against the inner wall of the shell, covering the opening $c^1$ in the shell and provided with openings $c^3$. There is provided about the shell $c$ a housing $c^4$, which may be provided with a damper-controlled cooled air inlet, as at $c^5$. The housing is also connected, as indicated at $c^6$, with an exhauster $c^7$ which draws the combustion gases through the kiln and through the bed of material in the heating zone and may discharge such gases into a suitable stack $c^8$. In order to prevent the combustion gases from passing directly from the shell $c$ within the housing without passing through the bed of material in the shell $c$, there are provided gas guards $c^9$ and $c^{10}$ which are secured to the housing and rest at their edges against the shell $c$, in such relation to the material in the shell $c$, as represented in Figure 5, so that practically all of the combustion gases which are received in the heating zone C from the calcining zone B are compelled to pass through the bed of material in the shell $c$.

It will be understood that such of the material as enters the shell $c$ in the form of dust or is produced in dust form in the shell by the possible breaking of nodules or pellets, will pass through the perforations in the lining and in the shell and will fall to the bottom of the housing $c^4$ where there may be provided a conveyor $c^{11}$ by which the dust may be conducted to an elevator $d$ for return to the nodule forming mechanism illustrated conventionally in Figure 1.

It will be understood that the upper end of the shell $c$ is closed, except for the chute $d^1$, by which the material is delivered to the shell from the nodule forming mechanism so that the escape of combustion gases at this point shall be reduced to a minimum. The devices for handling the material preparatory to its introduction into the kiln may be of any suitable character. The apparatus shown comprises a hopper $d^2$, something in the nature of a pug mill $d^3$, a water supply $d^4$, and a dust chute $d^5$.

Various changes in details of construction and arrangement can be made to suit different conditions of use and it will be understood that, except as pointed out in the accompanying claims, the invention is not restricted to the particular construction shown and described herein.

I claim as my invention:

1. In a rotary kiln, the combination of a main shell closed by a partition, a series of tubes interconnected in pairs, one tube of each pair being connected to the shell at one side of the partition and the other tube being connected to the shell at the other side of the partition, and means to cause the material to move upward through one of the tubes of each pair.

2. In a rotary kiln, the combination of a main shell closed by a partition at its upper end, a series of tubes interconnected in pairs, one tube of each pair being connected to the shell above the partition and the other tube being connected to the shell below the partition, and means to cause the material to move upward.

3. In a rotary kiln, the combination of a kiln section adapted to contain a sintering zone and having a fuel supply, a kiln section adapted to contain a calcining zone and having a main shell closed by a partition at one end, a series of interconnected tubes connected at one end to the shell of the kiln at one side of the partition to receive the material to be calcined and connected at the other end to the shell at the other side of the partition to deliver material to the main shell and receive the combustion gases from the sintering zone, and means to cause the material to move upward through the tubes connected at one side of the partition.

4. In a rotary kiln, the combination of a kiln section adapted to contain a sintering zone having a fuel supply, a kiln section adapted to contain a calcining zone and having a central shell with a partition at its upper end, a series of interconnected tubes connected at one end to the shell of the kiln above the partition to receive the material to be calcined and connected at the other end to the shell below the partition to deliver material to the central shell and receive the combustion gases from the sintering zone through such central shell, and means to cause the material to move upward through the tubes connected below the partition.

5. In a rotary kiln, the combination of a sintering zone having a fuel supply, a kiln section adapted to contain a calcining zone and having a central shell with a partition at its upper end, a series of interconnected tubes connected to the shell of the kiln above the partition to receive the material to be calcined and connected to the shell below the partition to deliver material to the central shell and receive the combustion gases from the sintering zone through such central shell, means to cause the material to move upward through the tubes connected below the partition, and means to draw the combustion gases through the kiln.

This specification signed this 18th day of June A. D. 1930.

POVL T. LINDHARD.